US012696931B2

(12) United States Patent
Russell et al.

(10) Patent No.: US 12,696,931 B2
(45) Date of Patent: Aug. 4, 2026

(54) SMOKING SUBSTITUTE SYSTEM

(71) Applicant: Imperial Tobacco Limited

(72) Inventors: Adam Russell, Liverpool (GB); Jason Roebuck, Liverpool (GB)

(73) Assignee: Imperial Tobacco Limited, Bristol (GB)

(*) Notice: Subject to any disclaimer, the term of this patent is extended or adjusted under 35 U.S.C. 154(b) by 570 days.

(21) Appl. No.: 17/708,557

(22) Filed: Mar. 30, 2022

(65) Prior Publication Data

US 2022/0218032 A1 Jul. 14, 2022

Related U.S. Application Data

(63) Continuation of application No. PCT/EP2020/077515, filed on Oct. 1, 2020.

(30) Foreign Application Priority Data

Oct. 4, 2019 (EP) .................................... 19201387

(51) Int. Cl.

| | |
|---|---|
| ***A24F 40/46*** | (2020.01) |
| ***A24F 40/20*** | (2020.01) |
| ***A24F 40/57*** | (2020.01) |
| ***B26D 1/00*** | (2006.01) |
| ***H05B 3/10*** | (2006.01) |

(52) U.S. Cl.

CPC .............. *A24F 40/46* (2020.01); *A24F 40/20* (2020.01); *A24F 40/57* (2020.01); *B26D 1/0006* (2013.01); *H05B 3/10* (2013.01); *B26D 2001/0053* (2013.01); *H05B 2203/005* (2013.01)

(58) Field of Classification Search

CPC .......... A24F 40/20; A24F 40/46; A24F 40/57; B26D 1/0006; B26D 2001/0053; H05B 3/10; H05B 2203/005

See application file for complete search history.

(56) References Cited

U.S. PATENT DOCUMENTS 5,228,460 A * 7/1993 Sprinkel ................ A24F 40/46 131/194
2019/0328038 A1* 10/2019 Huang ................ H05B 1/0227

FOREIGN PATENT DOCUMENTS

CN 204070570 U * 1/2015
CN 205491202 U * 8/2016
CN 207 411 491 U 5/2018
CN 208 175 985 U 12/2018
CN 109 123 803 A 1/2019

(Continued)

OTHER PUBLICATIONS

English Machine Translation of CN205491202U (Year: 2016).*

(Continued)

*Primary Examiner* — Katherine A Will

(74) *Attorney, Agent, or Firm* — DUNLAP CODDING, P.C.

(57) ABSTRACT

A smoking substitute system and device comprising a heater apparatus for a heat not burn smoking substitute device, the heater apparatus comprising a solid blade-type heating element adapted for insertion into a consumable for the heat not burn smoking device, wherein the heating element has a multi-sectional cross section comprising at least two sections, each of the sections having a surface normal vector with a direction; and wherein the directions of the surface normal vectors are non-parallel.

20 Claims, 7 Drawing Sheets

(56) References Cited

FOREIGN PATENT DOCUMENTS

| | | | |
|---|---|---|---|
| EP | 2 316 286 | A1 | 5/2011 |
| EP | 3 626 091 | A1 | 3/2020 |
| TW | I 664 922 | B | 7/2019 |
| WO | WO 2018/132935 | A1 | 7/2018 |
| WO | WO 2019/030364 | A1 | 2/2019 |
| WO | WO 2019/138042 | A1 | 7/2019 |
| WO | WO 2019/138045 | A1 | 7/2019 |

OTHER PUBLICATIONS

English Machine Translation of CN204070570U (Year: 2015).*

International Search Report and Written Opinion (PCT/EP2020/077515), Dec. 4, 2020, 14 pages.

International Search Report (19201387.8-1004), dated Apr. 17, 2020, 10 pages.

* cited by examiner

SMOKING SUBSTITUTE SYSTEM

CROSS-REFERENCE TO RELATED APPLICATIONS/INCORPORATION BY REFERENCE STATEMENT

This application is a non-provisional application claiming benefit to the international application no. PCT/EP2020/077515 filed on Oct. 1, 2020, which claims priority to EP 19201387.8 filed on Oct. 4, 2019. The entire contents of each of the above-referenced applications are hereby incorporated herein by reference in their entirety.

TECHNICAL FIELD

The present disclosure relates to a smoking substitute system and particularly, although not exclusively, to a smoking substitute system comprising a device and an aerosol-forming article having a novel heating element.

BACKGROUND

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Conventional combustible smoking articles, such as cigarettes, typically comprise a cylindrical rod of tobacco comprising shreds of tobacco which is surrounded by a wrapper, and usually also a cylindrical filter axially aligned in an abutting relationship with the wrapped tobacco rod. The filter typically comprises a filtration material which is circumscribed by a plug wrap. The wrapped tobacco rod and the filter are joined together by a wrapped band of tipping paper that circumscribes the entire length of the filter and an adjacent portion of the wrapped tobacco rod. A conventional cigarette of this type is used by lighting the end opposite to the filter, and burning the tobacco rod. The smoker receives mainstream smoke into their mouth by drawing on the mouth end or filter end of the cigarette.

Combustion of organic material such as tobacco is known to produce tar and other potentially harmful by-products. There have been proposed various smoking substitute systems (or "substitute smoking systems") in order to avoid the smoking of tobacco.

Such smoking substitute systems can form part of nicotine replacement therapies aimed at people who wish to stop smoking and overcome a dependence on nicotine.

Smoking substitute systems include electronic systems that permit a user to simulate the act of smoking by producing an aerosol (also referred to as a "vapor") that is drawn into the lungs through the mouth (inhaled) and then exhaled. The inhaled aerosol typically bears nicotine and/or flavorings without, or with fewer of, the odor and health risks associated with traditional smoking.

In general, smoking substitute systems are intended to provide a substitute for the rituals of smoking, whilst providing the user with a similar experience and satisfaction to those experienced with traditional smoking and with combustible tobacco products. Some smoking substitute systems use smoking substitute articles (also referred to as a "consumables") that are designed to resemble a traditional cigarette and are cylindrical in form with a mouthpiece at one end.

The popularity and use of smoking substitute systems has grown rapidly in the past few years. Although originally marketed as an aid to assist habitual smokers wishing to quit tobacco smoking, consumers are increasingly viewing smoking substitute systems as desirable lifestyle accessories.

There are a number of different categories of smoking substitute systems, each utilizing a different smoking substitute approach.

One approach for a smoking substitute system is the so-called Heated Tobacco ("HT") approach in which tobacco (rather than an "e-liquid") is heated or warmed to release vapor. HT is also known as "heat not burn" ("HNB"). The tobacco may be leaf tobacco or reconstituted tobacco. The vapor may contain nicotine and/or flavorings. In the HT approach the intention is that the tobacco is heated but not burned, i.e., the tobacco does not undergo combustion.

A typical HT smoking substitute system may include a device and a consumable. The consumable may include the tobacco material. The device and consumable may be configured to be physically coupled together. In use, heat may be imparted to the tobacco material by a heating element of the device, wherein airflow through the tobacco material causes components in the tobacco material to be released as vapor. A vapor may also be formed from a carrier in the tobacco material (this carrier may for example include propylene glycol and/or vegetable glycerin) and additionally volatile compounds released from the tobacco. The released vapor may be entrained in the airflow drawn through the tobacco.

As the vapor passes through the consumable (entrained in the airflow) from the location of vaporization to an outlet of the consumable (e.g., a mouthpiece), the vapor cools and condenses to form an aerosol for inhalation by the user. The aerosol will normally contain the volatile compounds.

In HT smoking substitute systems, heating as opposed to burning the tobacco material is believed to cause fewer, or smaller quantities, of the more harmful compounds ordinarily produced during smoking. Consequently, the HT approach may reduce the odor and/or health risks that can arise through the burning, combustion and pyrolytic degradation of tobacco.

There may be a need for improved design of smoking substitute systems, in particular HT smoking substitute systems, to enhance the user experience and improve the function of the HT smoking substitute system.

The present disclosure has been devised in the light of the above considerations.

SUMMARY OF THE DISCLOSURE

At its most general, the present disclosure relates to a smoking substitute device having a novel heating element. In particular, the heating element is a solid heating element comprising a novel shape.

According to a first aspect of the present disclosure, there is provided a heater apparatus for a heat not burn smoking substitute device, the heater apparatus comprising a solid blade-type heating element adapted for insertion into a consumable for the heat not burn smoking device, wherein the heating element has a multi-sectional cross section comprising at least two sections, each of the sections having a surface normal vector with a direction; and wherein the directions of the surface normal vectors are non-parallel.

By providing a heater apparatus comprising a solid blade-type heating element, the heater apparatus may be more rigid and stable that a regular blade-type heater with a substantially flat shape. The different sections may be angled with respect to one another and thus provide a supporting or stabilizing function to one another. In other words, one section is resting against or is attached to another section so to provide the support or brace to the other section. The solid blade-type heating element may be embodied as a solid or single element, or some, multiple or all sections may be formed as single sectional elements, resting against each other or supporting each other. In case the solid blade-type heating element is formed from a plurality of independent, yet being in contact, it may be possible to exchange sections or sectional element independently from other sections or sectional elements. Thus, an easy or simplified exchange of individual sections or sectional elements may be realized.

A heater apparatus comprising a solid blade-type heating element according to the first aspect may provide a profile for a heating element that provides maximum surface area for a specific cross section. This may further mean that a heating element may have more surface area in contact with the aerosol-generating substrate, e.g., tobacco material. This may provide better transference of heat between the heating element and tobacco and thus greater heating performance, and more even heating through the volume of the consumable, improving overall performance.

The solid blade-type heating element with multiple sections may allow to increase or maximize the effectiveness of the heating element while still allowing the heating element to be easily cleaned. In other words, the heating element may provide a stronger and/or more robust cross section, reducing the chance of damage during cleaning, so that more robust cleaning tools may be employed which would otherwise damage a common flat blade-type heating element. By supporting or bracing of multiple sections vs. one another, an allowed cleaning force introduced by a cleaning tool on the solid blade-type heating element and the individual sections, respectively, may be increased without damaging the solid blade-type heating element or the individual sections.

At the same time, the solid blade-type heating element and/or the individual sections may be formed by a comparably thinner or slimmer element or material, which requires less volume displacement in the aerosol-forming substrate. Consequently, an insertion into the consumable (i.e., piercing or slicing into the aerosol-generating substrate) and removal from the consumable of the solid blade-type heating element/the individual sections may be simplified and may require less force, thereby protecting and preserving the solid blade-type heating element/the individual sections and prolonging the lifespan of the solid blade-type heating element/the individual sections.

The term "solid" is intended to refer to a structure that is intended, at least during normal operation, to not change shape, bend, twist or turn, in particular when transitioning between a state where no consumable is present and a state where the consumable is present. In other words, the geometric shape should substantially remain unchanged between an inserted and an un-inserted consumable. Or rather, the shape of the structure should substantially not change when being inserted in a consumable and when no consumable is present. "Solid" however is not intended to imply that a structure is made as a single piece or element, and in particular that the structure does not have internal openings like slits, cuts or the like. A structure, made of a plurality of sections that adjoin appropriately, e.g., at a distal end intended for insertion into a consumable, and so form substantially a single structure, remain in the meaning of solid, even when comprising slits or cut-outs, as long as there is no intended change of shape between the inserted and the un-inserted state.

The term "distinct sections" or "separate sections" is intended to refer to an at least logical distinction between the sections. In other words, there must be a parameter, property or any type on indicator that is unique for a specific section, at least with regard to adjacent sections. Such a parameter, property or indicator may, e.g., be a distinct spatial orientation, dissimilar materials or physical properties, like, e.g., that sections are independently heatable. Preferably, such sections have a distinct spatial orientation and a further property, like independent heatability.

The term "blade-type heating element" is intended to refer to a heating element that is comparably thin in a first dimension and comparably thick in a second and possibly third dimension. Generally, a blade-type heating element may comprise a shape comparable to a knife, sword, a blade or a comparable cutting instrument. A blade-type heating element may in particular comprise a sharp edge for cutting or piercing of material, e.g., an aerosol-generating substrate of a consumable. In other words, a blade-type heating element is penetrating into the consumable, the aerosol-generating substrate, respectively, and is actively displacing material during the insertion. A heating element that is not cutting or piercing into material is not a "blade-type heating element" in the sense and meaning as used in the present specification.

The concept may not require any specific materials to be used, but a ceramic heater body with resistive or magnetically induced heating or comprising metal heating tracks may be employed.

Optional features will now be set out. These are applicable singly or in any combination with any aspect.

Advantageously, the heating element comprises a longitudinal extension having a direction substantially along the longitudinal axis of the heating element and wherein the surface normal vectors are measured substantially perpendicular to the longitudinal axis and/or the direction of the longitudinal extension of the heating element.

Such a longitudinal extension may provide the required length for insertion of the heating element into a consumable, and in particular into the part of the consumable comprising the aerosol-forming substrate.

Optionally, the heating element has a distal end, and wherein the distal end has a cutting edge for penetration into aerosol-generating material of a consumable.

Such a cutting edge may simplify and ease insertion of the heating element into the consumable and in particular into the part of the consumable comprising the aerosol-forming substrate.

Conveniently, the cutting edge forms at least one plane, and wherein the plane is at an angle with a plane perpendicular to the direction of the longitudinal extension of the heating element.

Such an angled plane or thus angled cutting edge may simplify and ease insertion of the heating element into the consumable and in particular into the part of the consumable comprising the aerosol-forming substrate.

Advantageously, the heating element comprises more than two sections, in particular three sections, further in particular four sections, further in particular five sections, further in particular six sections, further in particular seven sections, further in particular more than seven sections.

With an increase in the number of sections the rigidity, robustness and structural integrity of a heating element may increase, which in turn may allow to reduce the material for an individual section while maintaining a certain total robustness of the heating element.

Optionally, at least some of the sections are independently heatable, in particular wherein all sections are independently heatable.

Such may allow to control sections of the heating element independently for further control over the heating process of the aerosol-forming substrate, e.g., tobacco material. In the case of the heating element having protruding elements or protruding sections, like in a star, H, Y or the like configuration, the tobacco could be heated in "slices". This may result in a more even heating of sections within the aerosol-firming substrate, in particular when employing temperature controllable heating zones.

Conveniently, the heater apparatus comprises a power source, wherein the power source is connectable to at least one of the sections, and wherein when connected to the power source the section is heated.

Advantageously, the power source comprises a positive terminal and a negative terminal, wherein each heatable section comprises two terminals for connecting to the power source, wherein one terminal of each heatable section is connected to one of the positive terminal and the negative terminal and wherein the other terminal of each heatable section is selectively connectable to the other one of the positive terminal and the negative terminal.

Optionally, only a single heatable section is connectable to the power source at a given time or wherein a subset of heatable sections of the heatable sections is connectable simultaneously to the power source at a given time.

E.g., such may be realized by a heating element with a common "negative" contact, and separately controllable "positive" contacts in each section. By switching on the positive contacts separately and/or independently, each section of the element may be heated independently. By switching on multiple sections at a given time, the heating may further be individualized.

Conveniently, the heater apparatus comprises a controller, wherein the controller is controlling the connecting of heatable sections to the power source.

In other words, the controller may be arranged to switch, connect or disconnect the individual sections to and from the power source, for controlling the heating of the aerosol-forming substrate.

The heater apparatus according to at least one of the preceding claims, wherein the heater apparatus has one of a two section V-shape, a two section L-shape, a U-shape, an H-shape, a Y-shape, a double-Y-shape, a triangle shape, a three section star shape, a four section star shape, and a five section star shape.

The device may comprise an elongate body. An end of the elongate body may be configured for engagement with an aerosol-forming article. For example, the body may be configured for engagement with a heated tobacco (HT) consumable (or heat-not-burn (HNB) consumable). The terms "heated tobacco" and "heat-not-burn" are used interchangeably herein to describe a consumable that is of the type that is heated rather than combusted (or are used interchangeably to describe a device for use with such a consumable). The device may comprise a cavity that is configured for receipt of at least a portion of the consumable (i.e., for engagement with the consumable). The aerosol-forming article may be of the type that comprises an aerosol former (e.g., carried by an aerosol-forming substrate).

The device may comprise a heater for heating the aerosol-forming article. The heater may comprise a heating element, which may be in the form of a rod that extends from the body of the device. The heating element may extend from the end of the body that is configured for engagement with the aerosol-forming article.

The heater (and thus the heating element) may be rigidly mounted to the body. The heating element may be elongate so as to define a longitudinal axis and may, for example, have a transverse profile (i.e., transverse to a longitudinal axis of the heating element) that is substantially circular (i.e., the heating element may be generally cylindrical). Alternatively, the heating element may have a transverse profile that is rectangular (i.e., the heater may be a "blade heater"). The heating element may alternatively be in the shape of a tube (i.e., the heater may be a "tube heater"). The heating element may take other forms (e.g., the heating element may have an elliptical transverse profile). The shape and/or size (e.g., diameter) of the transverse profile of the heating element may be generally consistent for the entire length (or substantially the entire length) of the heating element.

The heating element may be between 15 mm and 25 mm long, e.g., between 18 mm and 20 mm long, e.g., around 19 mm long. The heating element may have a diameter of between 1.5 mm and 2.5 mm, e.g., a diameter between 2 mm and 2.3 mm, e.g., a diameter of around 2.15 mm.

The heating element may be formed of ceramic. The heating element may comprise a core (e.g., a ceramic core) comprising Al2O3. The core of the heating element may have a diameter of 1.8 mm to 2.1 mm, e.g., between 1.9 mm and 2 mm. The heating element may comprise an outer layer (e.g., an outer ceramic layer) comprising Al2O3. The thickness of the outer layer may be between 160 μm and 220 μm, e.g., between 170 μm and 190 μm, e.g., around 180 μm. The heating element may comprise a heating track, which may extend longitudinally along the heating element. The heating track may be sandwiched between the outer layer and the core of the heating element. The heating track may comprise tungsten and/or rhenium. The heating track may have a thickness of around 20 μm.

The heating element may be located in the cavity (of the device), and may extend (e.g., along a longitudinal axis) from an internal base of the cavity towards an opening of the cavity. The length of the heating element (i.e., along the longitudinal axis of the heater) may be less than the depth of the cavity. Hence, the heating element may extend for only a portion of the length of the cavity. That is, the heating element may not extend through (or beyond) the opening of the cavity.

The heating element may be configured for insertion into an aerosol-forming article (e.g., a HT consumable) when an aerosol-forming article is received in the cavity. In that respect, a distal end (i.e., distal from a base of the heating element where it is mounted to the device) of the heating element may comprise a tapered portion, which may facilitate insertion of the heating element into the aerosol-forming article. The heating element may fully penetrate an aerosol-forming article when the aerosol-forming article is received in the cavity. That is, the entire length, or substantially the entire length, of the heating element may be received in the aerosol-forming article.

The heating element may have a length that is less than, or substantially the same as, an axial length of an aerosol-forming substrate forming part of an aerosol-forming article (e.g., a HT consumable). Thus, when such an aerosol-forming article is engaged with the device, the heating element may only penetrate the aerosol-forming substrate, rather than other components of the aerosol-forming article. The heating element may penetrate the aerosol-forming substrate for substantially the entire axial length of the aerosol forming-substrate of the aerosol-forming article. Thus, heat may be transferred from (e.g., an outer circumferential surface of) the heating element to the surrounding aerosol-forming substrate, when penetrated by the heating element. That is, heat may be transferred radially outwardly (in the case of a cylindrical heating element) or, e.g., radially inwardly (in the case of a tube heater).

Where the heater is a tube heater, the heating element of the tube heater may surround at least a portion of the cavity. When the portion of the aerosol-forming article is received in the cavity, the heating element may surround a portion of the aerosol-forming article (i.e., so as to heat that portion of the aerosol-forming article). In particular, the heating element may surround an aerosol forming substrate of the aerosol-forming article. That is, when an aerosol-forming article is engaged with the device, the aerosol forming substrate of the aerosol-forming article may be located adjacent an inner surface of the (tubular) heating element. When the heating element is activated, heat may be transferred radially inwardly from the inner surface of the heating element to heat the aerosol forming substrate.

The cavity may comprise a (e.g., circumferential) wall (or walls) and the (tubular) heating element may extend around at least a portion of the wall(s). In this way, the wall may be located between the inner surface of the heating element and an outer surface of the aerosol-forming article. The wall (or walls) of the cavity may be formed from a thermally conductive material (e.g., a metal) to allow heat conduction from the heating element to the aerosol-forming article. Thus, heat may be conducted from the heating element, through the cavity wall (or walls), to the aerosol-forming substrate of an aerosol-forming article received in the cavity.

In some embodiments the device may comprise a cap disposed at the end of the body that is configured for engagement with an aerosol-forming article. Where the device comprises a heater having a heating element, the cap may at least partially enclose the heating element. The cap may be moveable between an open position in which access is provided to the heating element, and a closed position in which the cap at least partially encloses the heating element. The cap may be slidably engaged with the body of the device, and may be slidable between the open and closed positions.

The cap may define at least a portion of the cavity of the device. That is, the cavity may be fully defined by the cap, or each of the cap and body may define a portion of the cavity. Where the cap fully defines the cavity, the cap may comprise an aperture for receipt of the heating element into the cavity (when the cap is in the closed position). The cap may comprise an opening to the cavity. The opening may be configured for receipt of at least a portion of an aerosol-forming article. That is, an aerosol-forming article may be inserted through the opening and into the cavity (so as to be engaged with the device).

The cap may be configured such that when an aerosol-forming article is engaged with the device (e.g., received in the cavity), only a portion of the aerosol-forming article is received in the cavity. That is, a portion of the aerosol-forming article (not received in the cavity) may protrude from (i.e., extend beyond) the opening. This (protruding) portion of the aerosol-forming article may be a terminal (e.g., mouth) end of the aerosol-forming article, which may be received in a user's mouth for the purpose of inhaling aerosol formed by the device.

The device may comprise a power source or may be connectable to a power source (e.g., a power source separate to the device). The power source may be electrically connectable to the heater. In that respect, altering (e.g., toggling) the electrical connection of the power source to the heater may affect a state of the heater. For example, toggling the electrical connection of the power source to the heater may toggle the heater between an on state and an off state. The power source may be a power store. For example, the power source may be a battery or rechargeable battery (e.g., a lithium-ion battery).

The device may comprise an input connection (e.g., a USB port, Micro USB port, USB-C port, etc.). The input connection may be configured for connection to an external source of electrical power, such as a mains electrical supply outlet. The input connection may, in some cases, be used as a substitute for an internal power source (e.g., battery or rechargeable battery). That is, the input connection may be electrically connectable to the heater (for providing power to the heater). Hence, in some forms, the input connection may form at least part of the power source of the device.

Where the power source comprises a rechargeable power source (such as a rechargeable battery), the input connection may be used to charge and recharge the power source.

The device may comprise a user interface (UI). In some embodiments the UI may include input means to receive operative commands from the user. The input means of the UI may allow the user to control at least one aspect of the operation of the device. In some embodiments the input means may comprise a power button to switch the device between an on state and an off state.

In some embodiments the UI may additionally or alternatively comprise output means to convey information to the user. In some embodiments the output means may comprise a light to indicate a condition of the device (and/or the aerosol-forming article) to the user. The condition of the device (and/or aerosol-forming article) indicated to the user may comprise a condition indicative of the operation of the heater. For example, the condition may comprise whether the heater is in an off state or an on state. In some embodiments, the UI unit may comprise at least one of a button, a display, a touchscreen, a switch, a light, and the like. For example, the output means may comprise one or more (e.g., two, three, four, etc.) light-emitting diodes ("LEDs") that may be located on the body of the device.

The device may further comprise a puff sensor (e.g., airflow sensor), which form part of the input means of the UI. The puff sensor may be configured to detect a user drawing on an end (i.e., a terminal (mouth) end) of the aerosol-forming article. The puff sensor may, for example, be a pressure sensor or a microphone. The puff sensor may be configured to produce a signal indicative of a puff state. The signal may be indicative of the user drawing (an aerosol from the aerosol-forming article) such that it is, e.g., in the form of a binary signal. Alternatively, or additionally, the signal may be indicative of a characteristic of the draw (e.g., a flow rate of the draw, length of time of the draw, etc.).

The device may comprise a controller, or may be connectable to a controller that may be configured to control at least one function of the device. The controller may comprise a microcontroller that may, e.g., be mounted on a printed circuit board (PCB). The controller may also comprise a memory, e.g., non-volatile memory. The memory may include instructions, which, when implemented, may cause the controller to perform certain tasks or steps of a method. Where the device comprises an input connection, the controller may be connected to the input connection.

The controller may be configured to control the operation of the heater (and, e.g., the heating element). Thus, the controller may be configured to control vaporization of an aerosol forming part of an aerosol-forming article engaged with the device. The controller may be configured to control the voltage applied by power source to the heater. For example, the controller may be configured to toggle between applying a full output voltage (of the power source) to the heater and applying no voltage to the heater. Alternatively, or additionally, the control unit may implement a more complex heater control protocol.

The device may further comprise a voltage regulator to regulate the output voltage supplied by the power source to form a regulated voltage. The regulated voltage may subsequently be applied to the heater.

In some embodiments, where the device comprises a UI, the controller may be operatively connected to one or more components of the UI. The controller may be configured to receive command signals from an input means of the UI. The controller may be configured to control the heater in response to the command signals. For example, the controller may be configured to receive "on" and "off" command signals from the UI and, in response, may control the heater so as to be in a corresponding on or off state.

The controller may be configured to send output signals to a component of the UI. The UI may be configured to convey information to a user, via an output means, in response to such output signals (received from the controller). For example, where the device comprises one or more LEDs, the LEDs may be operatively connected to the controller. Hence, the controller may be configured to control the illumination of the LEDs (e.g., in response to an output signal). For example, the controller may be configured to control the illumination of the LEDs according to (e.g., an on or off) state of the heater.

Where the device comprises a sensor (e.g., a puff/airflow sensor), the controller may be operatively connected to the sensor. The controller may be configured to receive a signal from the sensor (e.g., indicative of a condition of the device and/or engaged aerosol-forming article). The controller may be configured to control the heater, or an aspect of the output means, based on the signal from the sensor.

The device may comprise a wireless interface configured to communicate wirelessly (e.g., via Bluetooth (e.g., a Bluetooth low-energy connection) or WIFI) with an external device. Similarly, the input connection may be configured for wired connection to an external device so as to provide communication between the device and the external device.

The external device may be a mobile device. For example, the external device may be a smart phone, tablet, smart watch, or smart car. An application (e.g., app) may be installed on the external device (e.g., mobile device). The application may facilitate communication between the device and the external device via the wired or wireless connection.

The wireless or wired interface may be configured to transfer signals between the external device and the controller of the device. In this respect, the controller may control an aspect of the device in response to a signal received from an external device. Alternatively, or additionally, an external device may respond to a signal received from the device (e.g., from the controller of the device).

In a second aspect, there is provided a system (e.g., a smoking substitute system) comprising a device according to the first aspect and an aerosol-forming article. The aerosol-forming article may comprise an aerosol-forming substrate at an upstream end of the aerosol-forming article. The article may be in the form of a smoking substitute article, e.g., heated tobacco (HT) consumable (also known as a heat-not-burn (HNB) consumable).

As used herein, the terms "upstream" and "downstream" are intended to refer to the flow direction of the vapor/aerosol, i.e., with the downstream end of the article/consumable being the mouth end or outlet where the aerosol exits the consumable for inhalation by the user. The upstream end of the article/consumable is the opposing end to the downstream end.

The aerosol-forming substrate is capable of being heated to release at least one volatile compound that can form an aerosol. The aerosol-forming substrate may be located at the upstream end of the article/consumable.

Optionally, the aerosol-forming article is a heat-not-burn (HNB) consumable comprising an aerosol-forming substrate, and wherein the heating element is penetrating into the aerosol-forming substrate.

By arranging the heating element in the aerosol-forming substrate, the heating element is capable of directly contacting the aerosol-forming substrate for a preferred heat transfer from the heater apparatus to the substrate. Thereby a preferred aerosol-generation is realizable by a direct contact heat transfer. The aerosol-forming article in general and the aerosol-forming substrate in particular may have been encapsulated by suitable means, like a foil or cover material, to avoid or reduce aerosol-generation in the absence of a heating element.

In order to generate an aerosol, the aerosol-forming substrate comprises at least one volatile compound that is intended to be vaporized/aerosolized and that may provide the user with a recreational and/or medicinal effect when inhaled. Suitable chemical and/or physiologically active volatile compounds include the group consisting of: nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing.

The aerosol-forming substrate may comprise plant material. The plant material may comprise least one plant material selected from the list including *Amaranthus dubius, Arctostaphylos uva-ursi* (Bearberry), *Argemone mexicana, Amica, Artemisia vulgaris*, Yellow Tees, *Galea zacatechichi, Canavalia maritima* (Baybean), *Cecropia mexicana* (Guam u ra), *Cestrum noctumum, Cynoglossum virginianum* (wild comfrey), *Cytisus scoparius*, Damiana, *Entada rheedii, Eschscholzia californica* (California Poppy), *Fittonia albivenis, Hippobroma longiflora, Humulus japonica* (Japanese Hops), *Humulus lupulus* (Hops), *Lactuca virosa* (Lettuce Opium), *Laggera alata, Leonotis leonurus, Leonurus cardiaca* (Motherwort), *Leonurus sibiricus* (Honeyweed), *Lobelia cardinalis, Lobelia inflata* (Indian-tobacco). *Lobelia siphilitica, Nepeta cataria* (Catnip), *Nicotiana* species (Tobacco), *Nymphaea alba* (White Lily), *Nymphaea caerulea* (Blue Lily), Opium poppy, *Passiflora incarnate* (Passionflower), *Pedicularis densiflora* (Indian Warrior), *Pedicularis groenlandica* (Elephant's Head), *Salvia divinorum, Salvia dorrii* (Tobacco Sage), *Salvia* species (Sage), *Scutellaria galericulata, Scutellaria lateriflora, Scutellaria nana, Scutellaria* species (Skullcap), *Sida acuta* (Wireweed), *Sida rhombifolia, Silene capensis, Syzygium aromaticum* (Clove), *Tagetes lucida* (Mexican Tarragon), *Tarchonanthus camphoratus, Tumera diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and *rustica* tobacco. This also includes blends of the above mentioned tobaccos.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The aerosol-forming substrate may comprise a gathered sheet of homogenized (e.g., paper/slurry recon) tobacco or gathered shreds/strips formed from such a sheet.

The aerosol-forming substrate may comprise one or more additives selected from humectants, flavorants, fillers, aqueous/non-aqueous solvents and binders.

The flavorant may be provided in solid or liquid form. It may include menthol, licorice, chocolate, fruit flavor (including, e.g., citrus, cherry etc.), vanilla, spice (e.g., ginger, cinnamon) and tobacco flavor. The flavorant may be evenly dispersed throughout the aerosol-forming substrate or may be provided in isolated locations and/or varying concentrations throughout the aerosol-forming substrate.

The aerosol-forming substrate may be formed in a substantially cylindrical shape such that the article/consumable resembles a conventional cigarette. It may have a diameter of between 5 and 10 mm, e.g., between 6 and 9 mm or 6 and 8 mm, e.g., around 7 mm. It may have an axial length of between 10 and 15 mm, e.g., between 11 and 14 mm such as around 12 or 13 mm.

The article/consumable may comprise at least one filter element. There may be a terminal filter element at the downstream/mouth end of the article/consumable.

The or at least one of the filter element(s) (e.g., the terminal filter element) may be comprised of cellulose acetate or polypropylene tow. The at least one filter element (e.g., the terminal filter element) may be comprised of activated charcoal. The at least one filter element (e.g., the terminal element) may be comprised of paper. The or each filter element may be at least partly (e.g., entirely) circumscribed with a plug wrap, e.g., a paper plug wrap.

The terminal filter element (at the downstream end of the article/consumable) may be joined to the upstream elements forming the article/consumable by a circumscribing tipping layer, e.g., a tipping paper layer. The tipping paper may have an axial length longer than the axial length of the terminal filter element such that the tipping paper completely circumscribes the terminal filter element plus the wrapping layer surrounding any adjacent upstream element.

In some embodiments, the article/consumable may comprise an aerosol-cooling element which is adapted to cool the aerosol generated from the aerosol-forming substrate (by heat exchange) before being inhaled by the user.

The article/consumable may comprise a spacer element that defines a space or cavity between the aerosol-forming substrate and the downstream end of the consumable. The spacer element may comprise a cardboard tube. The spacer element may be circumscribed by the (paper) wrapping layer.

According to a third aspect of the present disclosure, there is provided a method of using the system according to the second aspect, the method comprising inserting the aerosol-forming article into the device; and heating the article using at least one heatable section of the heating element.

In some embodiments the method may comprise inserting the article into a cavity within a body of the device and penetrating the article with the heating element of the device upon insertion of the article.

Optionally, the method comprises inserting the article into the smoking substitute device and penetrating the article with the heating element upon insertion of the article.

By arranging the heating element in the aerosol-forming substrate, the heating element is capable of directly contacting the aerosol-forming substrate for a preferred heat transfer from the heater apparatus to the substrate. Thereby a preferred aerosol-generation is realizable by a direct contact heat transfer. The aerosol-forming article in general and the aerosol-forming substrate in particular may have been encapsulated by suitable means, like a foil or cover material, to avoid or reduce aerosol-generation in the absence of a heating element.

The disclosure includes the combination of the aspects and preferred features described except where such a combination is clearly impermissible or expressly avoided.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE FIGURES

So that the disclosure may be understood, and so that further aspects and features thereof may be appreciated, embodiments illustrating the principles of the disclosure will now be discussed in further detail with reference to the accompanying figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art. All documents mentioned in this text are incorporated herein by reference.

Figure 1A:
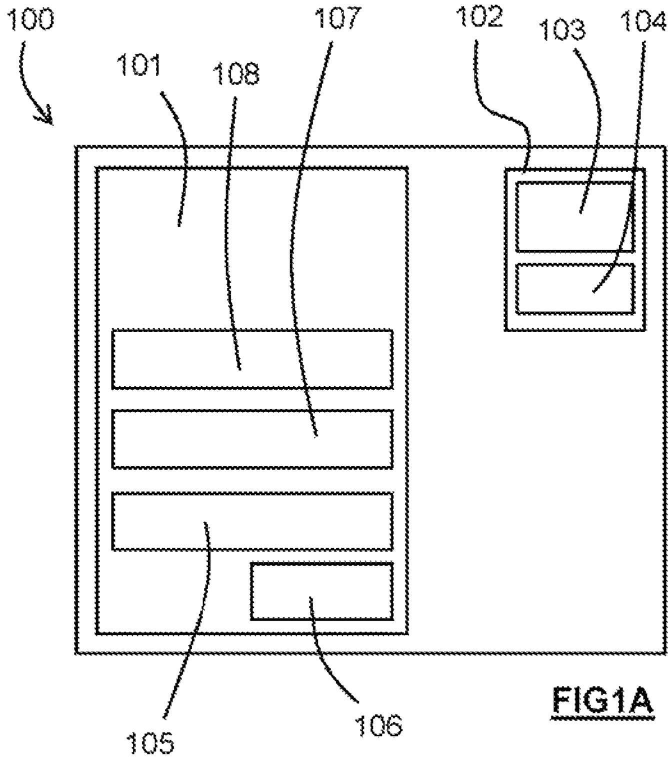
FIG. 1A is a schematic of a smoking substitute system.

FIG. 1A is a schematic providing a general overview of a smoking substitute system 100. The system 100 includes a substitute smoking device 101 and an aerosol-forming article in the form of a consumable 102, which comprises an aerosol former 103. The system is configured to vaporize the aerosol former by heating the aerosol former 103 (so as to form a vapor/aerosol for inhalation by a user).

In the illustrated system, the heater 104 forms part of the consumable 102 and is configured to heat the aerosol former 103. In this variation, the heater 104 is electrically connectable to the power source 105, for example, when the consumable 102 is engaged with the device 101. Heat from the heater 104 vaporizes the aerosol former 103 to produce a vapor. The vapor subsequently condenses to form an aerosol, which is ultimately inhaled by the user.

The system 100 further comprises a power source 105 that forms part of the device 101. In other embodiments the power source 105 may be external to (but connectable to) the device 101. The power source 105 is electrically connectable to the heater 104 such that it is able to supply power to the heater 104 (i.e., for the purpose of heating the aerosol former 103). Thus, control of the electrical connection of the power source 105 to the heater 104 provides control of the state of the heater 104. The power source 105 may be a power store, for example a battery or rechargeable battery (e.g., a lithium-ion battery).

The system 100 further comprises an I/O module comprising a connector 106 (e.g., in the form of a USB port, Micro USB port, USB-C port, etc.). The connector 106 is configured for connection to an external source of electrical power, e.g., a mains electrical supply outlet. The connector 106 may be used in substitution for the power source 105. That is the connector 106 may be electrically connectable to the heater 104 so as to supply electricity to the heater 104. In such embodiments, the device may not include a power source, and the power source of the system may instead comprise the connector 106 and an external source of electrical power (to which the connector 106 provides electrical connection).

In some embodiments, the connector 106 may be used to charge and recharge the power source 105 where the power source 105 includes a rechargeable battery.

The system 100 also comprises a user interface (UI) 107. Although not shown, the UI 107 may include input means to receive commands from a user. The input means of the UI 107 allows the user to control at least one aspect of the operation of the system 100. The input means may, for example, be in the form of a button, touchscreen, switch, microphone, etc.

The UI 107 also comprises output means to convey information to the user. The output means may, for example, comprise lights (e.g., LEDs), a display screen, speaker, vibration generator, etc.

The system 100 further comprises a controller 108 that is configured to control at least one function of the device 101. In the illustrated embodiment, the controller 108 is a component of the device 101, but in other embodiments may be separate from (but connectable to) the device 101. The controller 108 is configured to control the operation of the heater 104 and, for example, may be configured to control the voltage applied from the power source 105 to the heater 104. The controller 108 may be configured to toggle the supply of power to the heater 104 between an on state, in which the full output voltage of the power source 105 is applied to the heater 104, and an off state, in which the no voltage is applied to the heater 104.

Although not shown, the system 100 may also comprise a voltage regulator to regulate the output voltage from the power source 105 to form a regulated voltage. The regulated voltage may then be applied to the heater 104.

In addition to being connected to the heater 104, the controller 108 is operatively connected to the UI 107. Thus, the controller 108 may receive an input signal from the input means of the UI 107. Similarly, the controller 108 may transmit output signals to the UI 107. In response, the output means of the UI 107 may convey information, based on the output signals, to a user. The controller also comprises a memory 109, which is a non-volatile memory. The memory 109 includes instructions, which, when implemented, cause the controller to perform certain tasks or steps of a method.

Figure 1B:
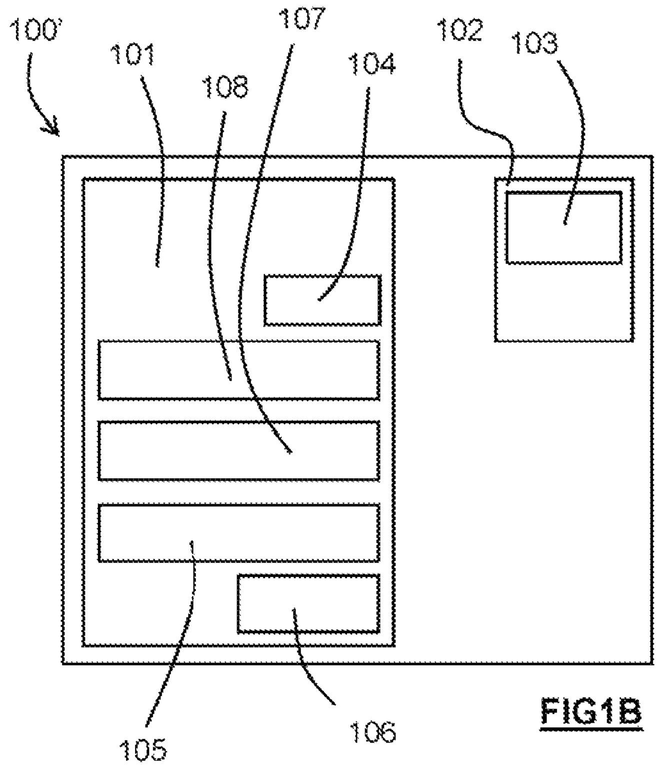
FIG. 1B is a schematic of a variation of the smoking substitute system of FIG. 1A.

FIG. 1B is a schematic showing a variation of the system 100 of FIG. 1A. In the system 100' of FIG. 1B, the heater 104 forms part of the device 101, rather than the consumable 102. In this variation, the heater 104 is electrically connected to the power source 105.

Figure 2A:
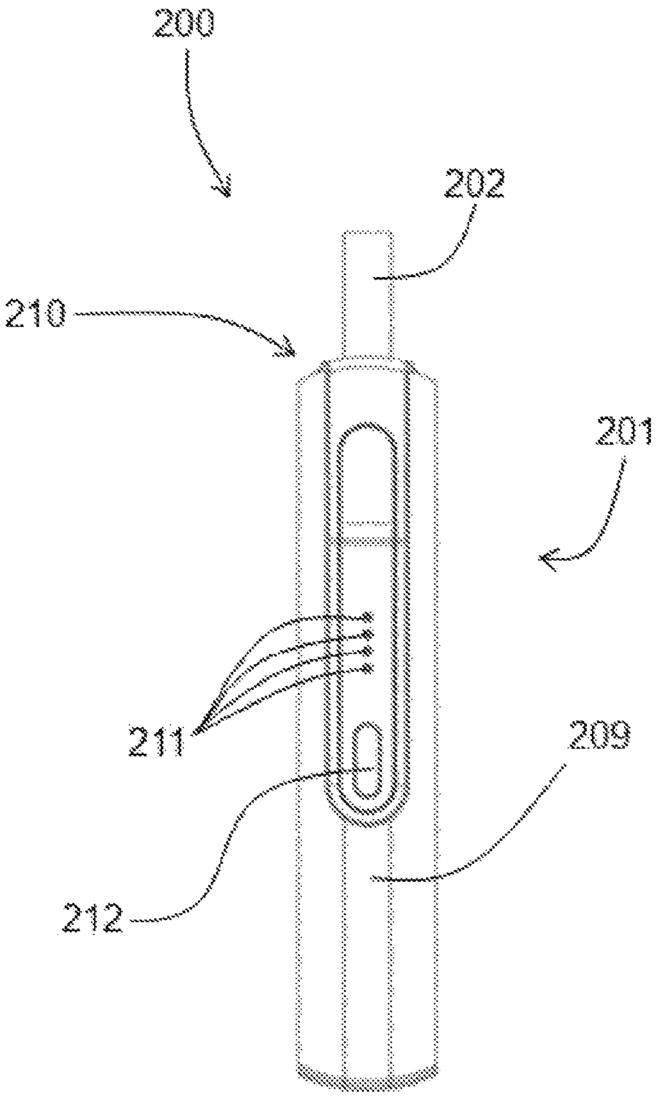
FIG. 2A is a front view of a first embodiment of a smoking substitute system with the consumable engaged with the device.
Figure 2B:
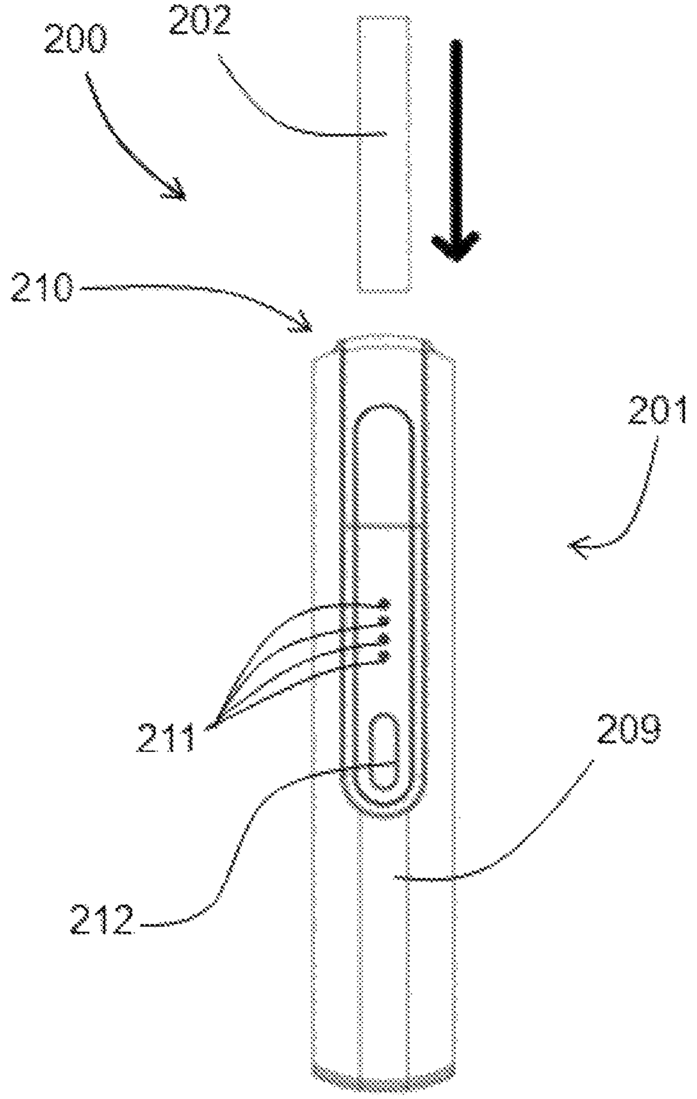
FIG. 2B is a front view of the first embodiment of the smoking substitute system with the consumable disengaged from the device.

FIGS. 2A and 2B illustrate a heated-tobacco (HT) smoking substitute system 200. The system 200 is an example of the systems 100, 100' described in relation to FIG. 1A or 1B. System 200 includes an HT device 201 and an HT consumable 202. The description of FIGS. 1A and 1B above is applicable to the system 200 of FIGS. 2A and 2B, and will thus not be repeated.

The device 201 and the consumable 202 are configured such that the consumable 202 can be engaged with the device 201. FIG. 2A shows the device 201 and the consumable 202 in an engaged state, whilst FIG. 2B shows the device 201 and the consumable 202 in a disengaged state.

The device 201 comprises a body 209 and cap 210. In use the cap 210 is engaged at an end of the body 209. Although not apparent from the figures, the cap 210 is moveable relative to the body 209. In particular, the cap 210 is slidable and can slide along a longitudinal axis of the body 209.

The device 201 comprises an output means (forming part of the UI of the device 201) in the form of a plurality of light-emitting diodes (LEDs) 211 arranged linearly along the longitudinal axis of the device 201 and on an outer surface of the body 209 of the device 201. A button 212 is also arranged on an outer surface of the body 209 of the device 201 and is axially spaced (i.e., along the longitudinal axis) from the plurality of LEDs 211.

Figure 2C:
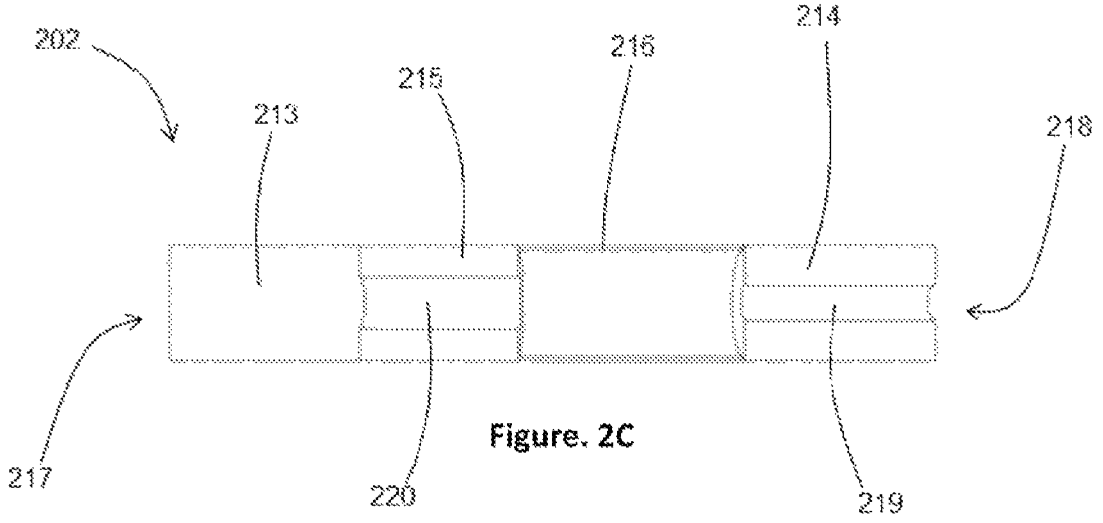
FIG. 2C is a section view of the consumable of the first embodiment of the smoking substitute system.

FIG. 2C show a detailed section view of the consumable of 202 of the system 200. The consumable 202 generally resembles a cigarette. In that respect, the consumable 202 has a generally cylindrical form with a diameter of 7 mm and an axial length of 70 mm. The consumable 202 comprises an aerosol forming substrate 213, a terminal filter element 214, an upstream filter element 215 and a spacer element 216. In other embodiments, the consumable may further comprise a cooling element. A cooling element may exchange heat with vapor that is formed by the aerosol-forming substrate 213 in order to cool the vapor so as to facilitate condensation of the vapor.

The aerosol-forming substrate 213 is substantially cylindrical and is located at an upstream end 217 of the consumable 202, and comprises the aerosol former of the system 200. In that respect, the aerosol forming substrate 213 is configured to be heated by the device 201 to release a vapor. The released vapor is subsequently entrained in an airflow flowing through the aerosol-forming substrate 213. The airflow is produced by the action of the user drawing on a downstream 218 (i.e., terminal or mouth) end of the consumable 202.

In the present embodiment, the aerosol forming substrate 213 comprises tobacco material that may, for example, include any suitable parts of the tobacco plant (e.g., leaves, stems, roots, bark, seeds and flowers). The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon). For example, the aerosol-forming substrate 213 may comprise a gathered sheet of homogenized (e.g., paper/slurry recon) tobacco or gathered shreds/strips formed from such a sheet.

In order to generate an aerosol, the aerosol forming substrate 213 comprises at least one volatile compound that is intended to be vaporized/aerosolized and that may provide the user with a recreational and/or medicinal effect when inhaled. The aerosol-forming substrate 213 may further comprise one or more additives. For example, such additives may be in the form of humectants (e.g., propylene glycol and/or vegetable glycerin), flavorants, fillers, aqueous/non-aqueous solvents and/or binders.

The terminal filter element 214 is also substantially cylindrical, and is located downstream of the aerosol forming substrate 213 at the downstream end 218 of the consumable 202. The terminal filter element 214 is in the form of a hollow bore filter element having a bore 219 (e.g., for airflow) formed therethrough. The diameter of the bore 219 is 2 mm. The terminal filter element 214 is formed of a porous (e.g., monoacetate) filter material. As set forth above, the downstream end 218 of the consumable 202 (i.e., where the terminal filter 214 is located) forms a mouthpiece portion of the consumable 202 upon which the user draws. Airflow is drawn from the upstream end 217, thorough the components of the consumable 202, and out of the downstream end 218. The airflow is driven by the user drawing on the downstream end 218 (i.e., the mouthpiece portion) of the consumable 202.

The upstream filter element 215 is located axially adjacent to the aerosol-forming substrate 213, between the aerosol-forming substrate 213 and the terminal filter element 214. Like the terminal filter 214, the upstream filter element 215 is in the form of a hollow bore filter element, such that it has a bore 220 extending axially therethrough. In this way, the upstream filter 215 may act as an airflow restrictor. The upstream filter element 215 is formed of a porous (e.g., monoacetate) filter material. The bore 220 of the upstream filter element 215 has a larger diameter (3 mm) than the terminal filter element 214.

The spacer 216 is in the form of a cardboard tube, which defines a cavity or chamber between the upstream filter element 215 and the terminal filter element 214. The spacer 216 acts to allow both cooling and mixing of the vapor/aerosol from the aerosol-forming substrate 213. The spacer has an external diameter of 7 mm and an axial length of 14 mm.

Although not apparent from the figure, the aerosol-forming substrate 213, upstream filter 215 and spacer 216 are circumscribed by a paper wrapping layer. The terminal filter 214 is circumscribed by a tipping layer that also circumscribes a portion of the paper wrapping layer (so as to connect the terminal filter 214 to the remaining components of the consumable 202). The upstream filter 215 and terminal filter 214 are circumscribed by further wrapping layers in the form of plug wraps.

Figure 2D:
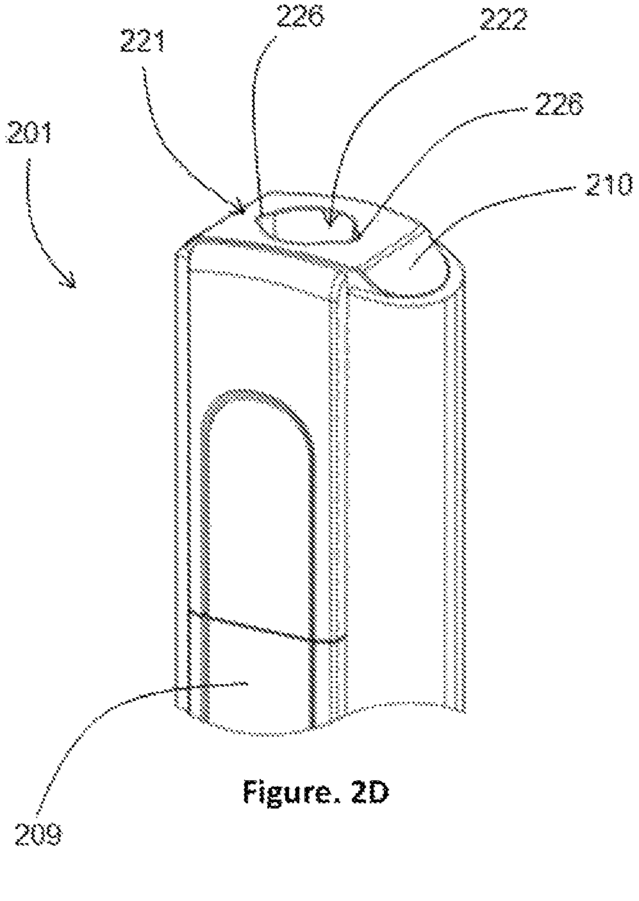
FIG. 2D is a detailed view of an end of the device of the first embodiment of the smoking substitute system.

Returning now to the device 201, FIG. 2D illustrates a detailed view of the end of the device 201 that is configured to engage with the consumable 202. The cap 210 of the device 201 includes an opening 221 to an internal cavity 222 (more apparent from FIG. 2D) defined by the cap 210. The opening 221 and the cavity 222 are formed so as to receive at least a portion of the consumable 202. During engagement of the consumable 202 with the device 201, a portion of the consumable 202 is received through the opening 221 and into the cavity 222. After engagement (see FIG. 2B), the downstream end 218 of the consumable 202 protrudes from the opening 221 and thus also protrudes from the device 201. The opening 221 includes laterally disposed notches 226. When a consumable 202 is received in the opening 221, these notches 226 remain open and could, for example, be used for retaining a cover in order to cover the end of the device 201.

Figure 2E:
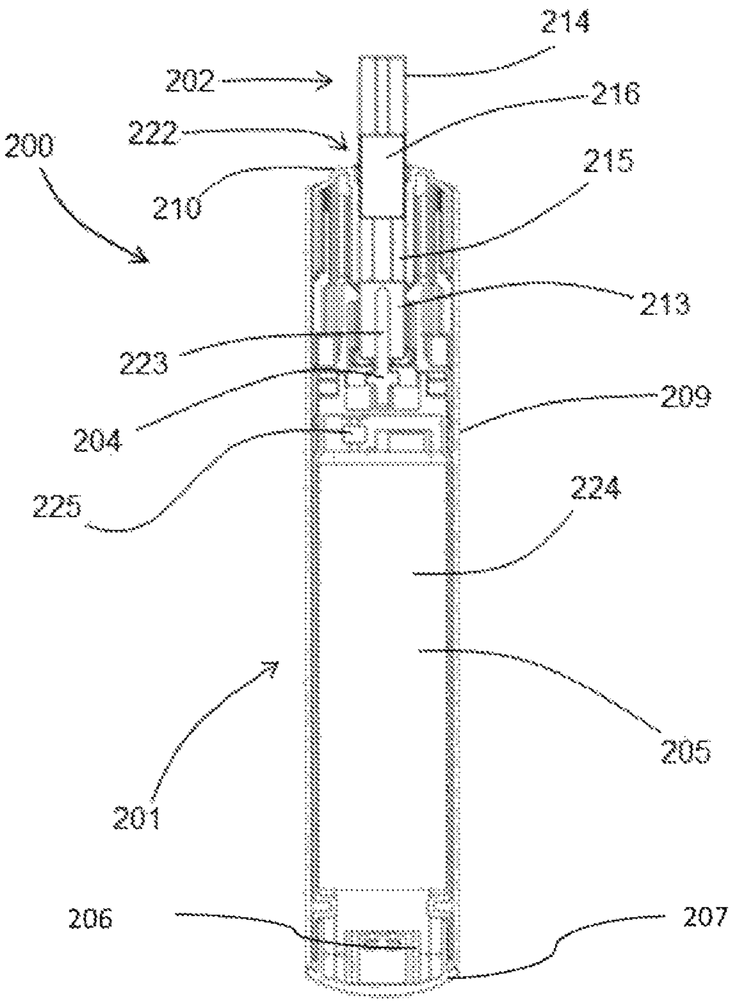
FIG. 2E is a section view of the first embodiment of the substitute smoking system.

FIG. 2E shows a cross section through a central longitudinal plane through the device 201. The device 201 is shown with the consumable 202 engaged therewith.

The device 201 comprises a heater 204 comprising heating element 223. The heater 204 forms part of the body 209 of the device 201 and is rigidly mounted to the body 209. In the illustrated embodiment, the heater 204 is a rod heater with a heating element 223 having a circular transverse profile. In other embodiments the heater may be in the form of a blade heater (e.g., heating element with a rectangular transverse profile) or a tube heater (e.g., heating element with a tubular form).

The heating element 223 of the heater 204 projects from an internal base of the cavity 222 along a longitudinal axis towards the opening 221. As is apparent from the figure, the length (i.e., along the longitudinal axis) of the heating element is less than a depth of the cavity 222. In this way, the heating element 223 does not protrude from or extend beyond the opening 221.

When the consumable 202 is received in the cavity 222 (as is shown in FIG. 2E), the heating element 223 penetrates the aerosol-forming substrate 213 of the consumable 202. In particular, the heating element 223 extends for nearly the entire axial length of the aerosol-forming substrate 213 when inserted therein. Thus, when the heater 204 is activated, heat is transferred radially from an outer circumferential surface the heating element 223 to the aerosol-forming substrate 213.

The device 201 further comprises an electronics cavity 224. A power source, in the form of a rechargeable battery 205 (a lithium-ion battery), is located in electronics cavity 224.

The device 201 includes a connector (i.e., forming part of an IO module of the device 201) in the form of a USB port 206. The connector may alternatively be, for example, a micro-USB port or a USB-C port for examples. The USB port 206 may be used to recharge the rechargeable battery 205.

The device 201 includes a controller (not shown) located in the electronics cavity 224. The controller comprises a microcontroller mounted on a printed circuit board (PCB). The USB port 206 is also connected to the controller 208 (i.e., connected to the PCB and microcontroller).

The controller 208 is configured to control at least one function of the device 202. For example, the controller 208 is configured to control the operation of the heater 204. Such control of the operation of the heater 204 may be accomplished by the controller toggling the electrical connection of the rechargeable battery 205 to the heater 204. For example, the controller 208 is configured to control the heater 204 in response to a user depressing the button 212. Depressing the button 212 may cause the controller to allow a voltage (from the rechargeable battery 205) to be applied to the heater 204 (so as to cause the heating element 223 to be heated).

The controller is also configured to control the LEDs 211 in response to (e.g., a detected) a condition of the device 201 or the consumable 202. For example, the controller may control the LEDs to indicate whether the device 201 is in an on state or an off state (e.g., one or more of the LEDs may be illuminated by the controller when the device is in an on state).

The device 201 comprises a further input means (i.e., in addition to the button 212) in the form of a puff sensor 225. The puff sensor 225 is configured to detect a user drawing (i.e., inhaling) at the downstream end 218 of the consumable 202. The puff sensor 225 may, for example, be in the form of a pressure sensor, flowmeter or a microphone. The puff sensor 225 is operatively connected to the controller 208 in the electronics cavity 224, such that a signal from the puff sensor 225, indicative of a puff state (i.e., drawing or not drawing), forms an input to the controller 208 (and can thus be responded to by the controller 208).

Figure 3A:
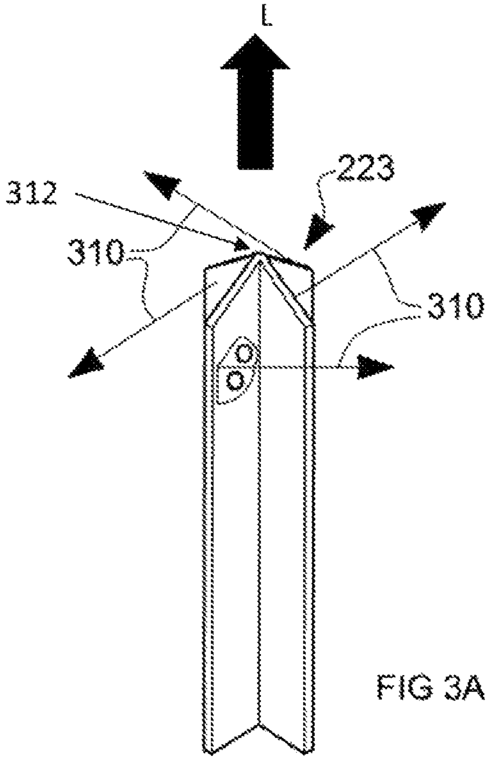
FIGS. 3A-B are views of an exemplary embodiment of a heating element of the of the smoking substitute system.
Figure 3B:
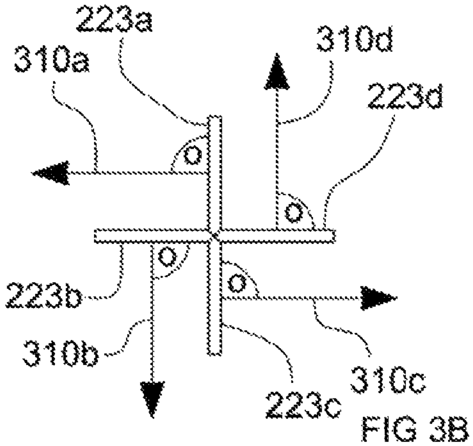

FIGS. 3A-B are views of an exemplary embodiment of a heating element 223 of the smoking substitute system 200.

In FIGS. 3A-B, the heating element 223 is exemplarily a solid blade-type heating element 223 having exemplarily a star shape with four sections 223*a*, 223*b*, 223*c*, 223*d*, which are embodied as four protruding blade-like elements or sections. These protruding blade-like elements or sections are generally referred to as protrusions in the following. The angle between the sections is substantially 90'. The heating element 223 has a distal end 312 and a longitudinal extension L, indicated by the thick arrow in FIG. 3A.

On each section, a surface normal vector 310 is depicted. Each section 223*a*, 223*b*, 223*c*, 223*d* has its dedicated normal vector 310*a*, 310*b*, 310*c*, 310*d*. The normal vectors are perpendicular to the surface plane of the respective section, depicted exemplarity for the front most surface vector and indicated by the two perpendicular right angel signs. In the subsequent figures, some surface vectors are depicted with only a single right-angle sign. This is still to be interpreted that the surface vector of a plane, at that point, is perpendicular to the respective local surface plane of the respective section. Possibly, some normal vectors are depicted completely omitting any right-angle sign, without deviation from this rationale. Nevertheless, these normal vectors still should be considered to be perpendicular to the respective local surface plane of the respective section.

FIG. 3B shows a detail view of the alignment of the normal vectors. FIG. 3B is a view in the direction of the longitudinal extension L as symbolized by the black arrow in FIG. 3A. As depicted, the respective normal vectors 310*a*, 310*b*, 310*c*, 310*d* are perpendicular to the surface plane of its respective sections 223*a*, 223*b*, 223*c*, 223*d*. The heating element thus consists of a plurality of sections that have non-parallel normal vectors.

The sections are arranged so that they adjoin centrally. The heating element 223 may be a solid, integral, one-piece element, where the sections 223*a*, 223*b*, 223*c*, 223*d* are integrally connected in the center, or the sections may be arranged so to be aligned as depicted, but centrally only resting against one another and thus supporting each other, e.g., by means of friction, so to form the solid heating element 223.

The distal end 312 comprises a sharp or cutting edge to aid insertion of the heating element into an aerosol-forming article or consumable. In other words, the distal end cuts open a part of the aerosol-forming article for penetration of the heating element into the aerosol-forming article, and in particular into the aerosol-generating substrate or tobacco material of the consumable. The distal end, as depicted in FIG. 3A, may comprise angled edges. Put another way, the edges are angled vs. a plane that is perpendicular to the longitudinal extension L of the heating element 223.

Each section 223*a*, 223*b*, 223*c*, 223*d* is independently heatable, thus comprises means for heating the respective section. The means are not depicted in FIGS. 3A-B. The means may provide resistive or magnetically induced heating or may comprise metal heating tracks, which are heated by a current flow. When inserted into the aerosol-forming substrate of the consumable, the heatable sections are arranged to heat a section of aerosol-forming substrate adjacent to the heatable section. By controlling and individually heating the heatable sections, the heating of the aerosol-forming substrate may be influenced, e.g., only a single section may be heated at a given time.

A section may correspond to a puff, a plurality of puffs or even may be comparable to the experience gained from a single common cigarette. In consequence, while a part of the aerosol-forming substrate is currently used for aerosol generation, the remaining aerosol-forming substrate sections may be spared for separate, in particular later consumption. Likewise, controlling and activating a plurality, or all, of heatable sections at the same time, allows a better control over the heating process due to the sections being independently controllable in their heating characteristics, e.g., a single section may be heater to a high temperature, or alternatively, multiple sections may be heated to a lower temperature.

As can be taken from FIGS. 3A-B, the cross section of the heating element 223 is such that the heating element is more robust and has a higher structural integrity than a regular blade heater, consisting of a single and possibly flexible blade. Insertion and removal is thus simplified and the heater may withstand increased cleaning forces applied by an external cleaning tool.

Figure 4A:
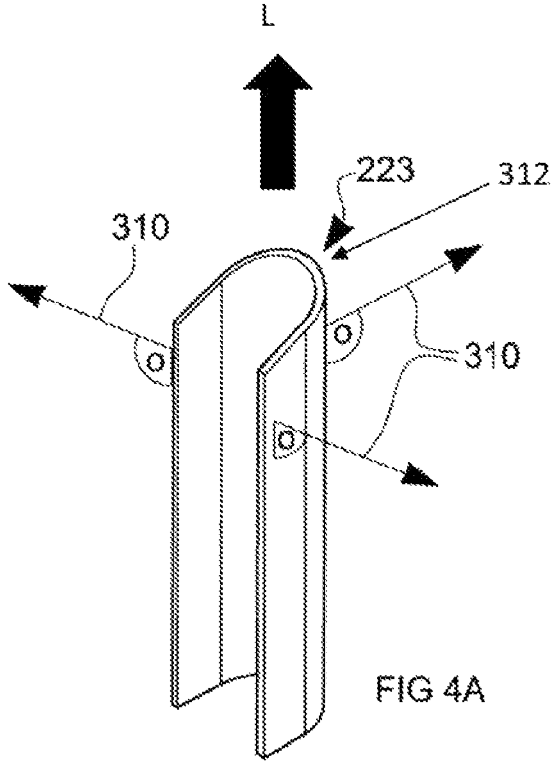
FIGS. 4A-B are views of a further exemplary embodiment of a heating element of the of the smoking substitute system.
Figure 4B:
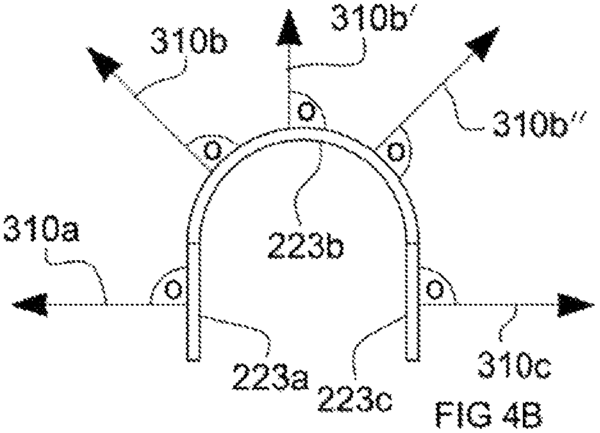

FIGS. 4A-B are views of a further exemplary embodiment of a heating element 223 of the of the smoking substitute system 200.

FIGS. 4A-B depict an exemplary embodiment of a heating element 223, while substantially comparable to what was described with regard to FIGS. 3A-B, now having three sections, and comprising a convoluted shape forming an open-ended shape. The shape may be called U-shape. Of the three sections, at least two sections comprise surface normal vectors that are non-parallel. Sections 223*a* and 223*c* may be considered to have normal vectors 310*a*, 310*c*, having similar direction but opposite orientation. Section 223*b* exemplarily is a curved section connecting sections 223*a* and 223*c*. Due to the curvature, section 223*b* has infinite surface normal vectors 310*b* along its circumference, of which exemplarily three vectors 310*b*, 310*b*', 310*b*" are depicted in FIG. 4B. As can be taken from FIG. 4B, no vector 310*b* may be arranged parallel to either vector 310*a* or 310*c*.

Sections 223*a*, 223*b*, 223*c* of FIGS. 4A-B are independently heatable, as with the embodiment of FIGS. 3A-B. With the convoluted or curved section 223*b*, it is possible to concentrate heat in the inside of the U-shape, thereby allowing a preferred heating of an aerosol-forming substrate arranged in the interior of the U-shape, possibly employing one or more, e.g., all three sections 223*a*, 223*b*, 223*c*.

The distal end 312 again is inclined or angled vs. a plane perpendicular to the longitudinal extension L, thereby allowing simplified penetration and insertion of the heating element 223 into an aerosol-forming article, while at the same time allowing enclosing of aerosol-forming substrate within the interior of the U-shape for preferred heating.

FIGS. 5A to F are views of further exemplary embodiments of a heating element 223 of the of the smoking substitute system 200.

While the shapes vary in FIG. 5A to F much or all of the features describes in relation to FIGS. 3A-B and FIGS. 4A-B apply to FIG. 5A to F as well, and vice versa.

Figure 5A:
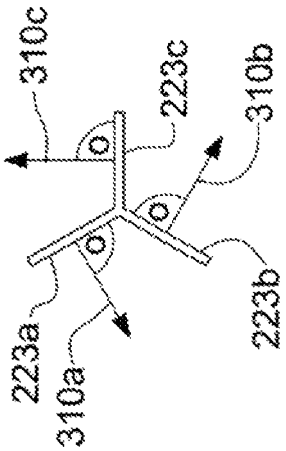
FIGS. 5A to F are views of further exemplary embodiments of a heating element of the of the smoking substitute system.

FIG. 5A depicts a star-shape heating element 223 with three sections 223*a*, 223*b*, 223*c*. The angle between the sections 223*a*, 223*b*, 223*c* may in particular be substantially 120'. The distal end may be inclined or forming a cone vs. a plane perpendicular to the longitudinal extension L, not separately depicted, as well. The sections may be independently heatable.

Figure 5B:
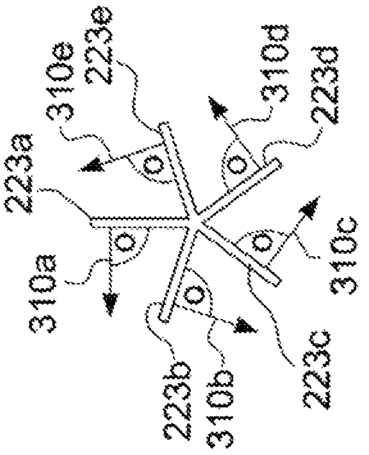

FIG. 5B depicts a star-shape heating element 223 with exemplarily five sections 223*a*, 223*b*, 223*c*, 223*d*, 223*e*. The angle between the sections 223*a*, 223*b*, 223*c*, 223*d*, 223*e* may in particular be substantially 72°. The distal end may be inclined or forming a cone vs. a plane perpendicular to the longitudinal extension L, not separately depicted, as well. The sections may be independently heatable.

Figure 5C:
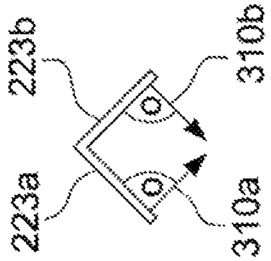

FIG. 5C depicts a V-shape heating element 223 with two sections 223*a*, 223*b*. The angle between the sections 223*a*, 223*b* may in particular be substantially 90°. The distal end may be inclined or forming a cone vs. a plane perpendicular to the longitudinal extension L, not separately depicted, as well. The sections may be independently heatable. A further, not depicted triangle shaped heating element 223 may be conceivable, comprising a closed triangle-shape with three sections 223*a*, 223*b*, 223*c*, either being equilateral or equiangular, or having any arbitrary triangular shape.

Figure 5D:
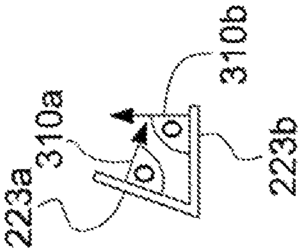

FIG. 5D depicts an L-shape heating element 223 with two sections 223*a*, 223*b*. The angle between the sections 223*a*, 223*b* may in particular be smaller than 90°. The distal end may be inclined or forming a cone vs. a plane perpendicular to the longitudinal extension L, not separately depicted, as well. The sections may be independently heatable. A further, not depicted triangle shaped heating element 223 may be conceivable as well, comprising a closed triangle-shape with three sections 223*a*, 223*b*, 223*c*, either being equilateral or equiangular, or having any arbitrary triangular shape.

Figure 5E:
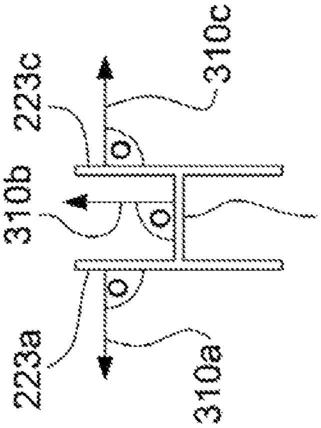

FIG. 5E depicts an H-shape heating element 223 with three sections 223*a*, 223*b*, 223*c*, or four, or five sections, in case at least one of the respective depicted sections 223*b*, 223*c* were divided into separate sections. The distal end may be inclined or forming a cone vs. a plane perpendicular to the longitudinal extension L, not separately depicted, as well. The sections may be independently heatable.

Figure 5F:
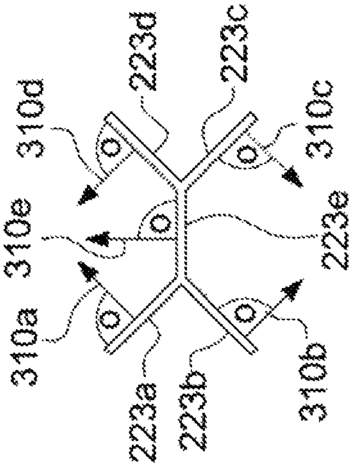

FIG. 5F depicts a double Y-shape heating element 223 with five sections 223*a*, 223*b*, 223*c*, 223*d*, 223*e*. The angle between the sections 223*a* and 223*b* may be substantially 90°, as may be the angle between sections 223*d* and 223*e*. The angle between the bridge section 223*e* and the two outer Y-sections may, e.g., be 135. The distal end may be inclined or forming a cone vs. a plane perpendicular to the longitudinal extension L, not separately depicted, as well. The sections may be independently heatable.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilized for realizing the disclosure in diverse forms thereof.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the words "have", "comprise", and "include", and variations such as "having", "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means, for example, +/−10%.

The words "preferred" and "preferably" are used herein refer to embodiments of the disclosure that may provide certain benefits under some circumstances. It is to be appreciated, however, that other embodiments may also be preferred under the same or different circumstances. The recitation of one or more preferred embodiments therefore does not mean or imply that other embodiments are not useful, and is not intended to exclude other embodiments from the scope of the disclosure, or from the scope of the claims.

The invention claimed is:

1. A heater apparatus for a heat not burn smoking substitute device, the heater apparatus comprising:

a solid blade-type heating element adapted for insertion into a consumable for the heat not burn smoking device, the heating element comprising a longitudinal extension having a direction (L) substantially along a longitudinal axis of the heating element, wherein the heating element has a multi-sectional cross section comprising at least two heatable sections, each of the heatable sections having a surface normal vector with a direction;

wherein the multi-sectional cross section comprises a curved heatable section which is curved in a plane perpendicular to the longitudinal extension (L); and wherein the directions of the surface normal vectors are non-parallel; and a power source, wherein the power source is connectable to at least one of the heatable sections, wherein when connected to the power source the at least one heatable section is heated;

wherein each heatable section is configured to be exchanged independently from other heatable sections of the heating element.

2. The heater apparatus according to claim 1,
wherein the surface normal vectors are measured substantially perpendicular to the longitudinal axis and/or the direction of the longitudinal extension of the heating element.

3. The heater apparatus according to claim 1,
wherein the heating element has a distal end, and
wherein the distal end has a cutting edge for penetration into aerosol-generating material of a consumable.

4. The heater apparatus according to claim 3,
wherein the cutting edge forms at least one plane, and
wherein the plane is at an angle with a plane perpendicular to the direction of a longitudinal extension of the heating element.

5. The heater apparatus according to claim 1, wherein the heating element comprises more than two sections.

6. The heater apparatus according to claim 5, wherein the heating element comprises three sections.

7. The heater apparatus according to claim 5, wherein the heating element comprises four sections.

8. The heater apparatus according to claim 5, wherein the heating element comprises five sections.

9. The heater apparatus according to claim 5, wherein the heating element comprises six sections.

10. The heater apparatus according to claim 5, wherein the heating element comprises seven sections.

11. The heater apparatus according to claim 5, wherein the heating element comprises more than seven sections.

12. The heater apparatus according to claim 1, wherein at least some of the heatable sections are independently heatable.

13. The heater apparatus according to claim 12, wherein all sections are independently heatable.

14. The heater apparatus according to claim 1,
wherein the power source comprises a positive terminal and a negative terminal;
wherein each heatable section comprises two terminals for connecting to the power source;
wherein one terminal of each heatable section is connected to one of the positive terminal and the negative terminal; and
wherein the other terminal of each heatable section is selectively connectable to the other one of the positive terminal and the negative terminal.

15. The heater apparatus according to claim 1, further comprising a controller,
wherein the controller is controlling the connecting of heatable sections to the power source.

16. The heater apparatus according to claim 1, wherein the heater apparatus has a U-shape.

17. A substitute smoking system comprising:
a heater apparatus according to claim 1; and
an aerosol-forming article.

18. A substitute smoking system according to claim 17, wherein the aerosol-forming article is a heat-not-burn (HNB) consumable comprising an aerosol-forming substrate, and wherein the heating element is penetrating into the aerosol-forming substrate.

19. A method of using the substitute smoking system according to claim 17, the method comprising:
inserting the aerosol-forming article into a smoking substitute device; and
heating the aerosol-forming article using at least one heatable section of the heating element.

20. A method according to claim 19, comprising inserting the aerosol-forming article into the smoking substitute device and penetrating the aerosol-forming article with the heating element upon insertion of the aerosol-forming article.

* * * * *